United States Patent
Portas et al.

(10) Patent No.: US 7,838,770 B2
(45) Date of Patent: Nov. 23, 2010

(54) METHOD AND DEVICE FOR SPLICING ELECTRIC CABLES

(75) Inventors: Francesco Portas, Milan (IT); Ubaldo Vallauri, Milan (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 366 days.

(21) Appl. No.: 11/573,434

(22) PCT Filed: Sep. 16, 2004

(86) PCT No.: PCT/EP2004/010461
§ 371 (c)(1),
(2), (4) Date: Sep. 22, 2008

(87) PCT Pub. No.: WO2006/029646
PCT Pub. Date: Mar. 23, 2006

(65) Prior Publication Data
US 2009/0008149 A1    Jan. 8, 2009

(51) Int. Cl.
*H01R 4/00* (2006.01)

(52) U.S. Cl. .................. 174/84 R; 174/92; 29/605; 428/34.9

(58) Field of Classification Search ............... 174/74 R, 174/77 R, 84 R, 91, 92, 74 A, 93, 138 F, 174/73.1; 428/36.92, 34.9, 35.1, 36.8; 29/605; 138/103
See application file for complete search history.

(56) References Cited

U.S. PATENT DOCUMENTS 4,383,131 A    5/1983    Clabburn (Continued)

FOREIGN PATENT DOCUMENTS

EP    199 742    4/1986

(Continued)

*Primary Examiner*—William H Mayo, III
(74) *Attorney, Agent, or Firm*—Norris McLaughlin & Marcus (57) ABSTRACT

The present invention relates to a method as well as to a joint assembly (12) for splicing a first and a second eclectic cable (1, 2) by means of a tubular elastic sleeve (15) at a splicing zone (11) between such cables (1, 2), said tubular sleeve (15) being supported in an expanded condition on a removable hollow supporting element (16) detachable in a first supporting portion (17) and a second supporting portion (18). The method of the invention comprises the steps of—providing a tubular elastic sleeve (15) supported in a radially expanded condition on a removable hollow supporting element (16) detachable in a first supporting portion (17) and a second supporting portion (18),—placing the sleeve (15) fitted on the supporting element (16) substantially coaxially with one of the first electric cable (1) and of the second electric cable (2) and radially external thereto,—forming an electric connection between the conductors (3, 4) thereby obtaining a splicing zone (11),—placing the sleeve (15) fitted on the supporting element (16) substantially coaxially with said the zone (11) and radially external thereto,—triggering an axial displacement of the first and second supporting portions (17, 18) so as to start an elastic recovering of the tubular sleeve (15) onto the splicing zone (11) capable to expel the first and second supporting portions (17, 18) from the sleeve (15) at an expulsion speed, and—adjusting the expulsion speed of the first and second supporting portions (17, 18) away from the splicing zone (11) so as to adapt the expulsion speed to the elastic recovering of the tubular sleeve (15).

35 Claims, 4 Drawing Sheets

U.S. PATENT DOCUMENTS

| | | | |
|---|---|---|---|
| 5,801,332 A * | 9/1998 | Berger et al. | 174/73.1 |
| 6,171,669 B1 * | 1/2001 | Vallauri et al. | 428/34.9 |
| 6,472,600 B1 * | 10/2002 | Osmani et al. | 174/75 R |
| 7,511,222 B2 * | 3/2009 | Taylor et al. | 174/84 R |
| 2004/0099434 A1 * | 5/2004 | Balconi et al. | 174/88 R |

FOREIGN PATENT DOCUMENTS

| | | |
|---|---|---|
| EP | 379 056 | 7/1990 |
| EP | 393 495 | 10/1990 |
| EP | 415 082 | 3/1991 |
| EP | 422 567 | 4/1991 |
| EP | 541 000 | 5/1993 |
| EP | 547 656 | 6/1993 |
| EP | 547 667 | 6/1993 |
| EP | 735 639 | 10/1996 |
| EP | 1 006 632 | 6/2000 |
| EP | 1 263 107 | 12/2002 |

* cited by examiner

METHOD AND DEVICE FOR SPLICING ELECTRIC CABLES

FIELD OF THE INVENTION

The present invention relates to a method and a device, namely a joint assembly, for splicing electric cables, for instance to confer thereto insulating, conductive and/or protective properties.

The device and the method of the present invention are particularly (but not exclusively) suitable for restoring the electric connection between sections of cables for conveying or supplying energy, more particularly for conveying or supplying high or very high voltage energy.

In the present description, the term "medium voltage" is used to refer to a tension typically from about 1 kV to about 30 kV, while the term "high voltage" refers to a tension above 30 kV. The term "very high voltage" is used to define a voltage greater than about 150 kV or 220 kV, up to 500 kV or more.

The electric cables spliced according to the present invention can be of the single-pole type (unipolar cable) or of the multi-pole type (e.g. double-pole or triple-pole cables).

Moreover, the electric cables spliced according to the present invention can be used for direct current (DC) or alternating current (AC) transmission or distribution.

Furthermore, the method and the device of the present invention can be applied to any electric or optical connection forming part of an electric and/or telecommunication network, as well as to any electric connection between a cable and an electric apparatus, e.g. a termination.

PRIOR ART

Cables for conveying or supplying energy, in particular for conveying or supplying medium or high voltage energy, generally comprise, starting from the radially innermost position to the radially outermost position of the cable: a metal conductor, an inner semiconductive layer, an insulating layer, an outer semiconductive layer, a metal screen—usually made of aluminum, lead or copper—and an outer protective polymeric sheath. The assembly consisting of the following cable constitutive elements: metal conductor, inner semiconductive layer, insulating layer and outer semiconductive layer—in the above mentioned sequence—is a semi-finished product which is generally indicated as "cable core".

In order to splice two electric cables, for example of the single-pole type, the ends thereof are beforehand processed so as to expose, over a portion of predetermined length, the elements forming the above-mentioned cables. Subsequently, the two cables are spliced by forming an electric connection between the conductors thereof, for example by soldering or scarfing said conductors, and by subsequently positioning a joint assembly—which is produced separately—in correspondence of the splicing zone (i.e. the zone where said conductors are spliced together).

A joint assembly generally comprises a tubular elastic sleeve which preferably comprises a plurality of radially superimposed elements intended to restore the electric and mechanical connection of the exposed layers of a first cable and a second cable to be spliced.

Such a tubular elastic sleeve can be applied at the splicing zone of two electric cables in the form of a shrinkable sleeve by radially pre-expanding said sleeve and successively causing the same to collapse onto the cable by means of heat (heat-shrinkable sleeve) or by removal of a supporting element previously arranged so as to hold the elastic sleeve in a radially stretched condition (cold-shrinkable sleeve).

Methods for manufacturing joint assemblies, or portions thereof, are known in the art and described, for example, in documents EP-A-0 379 056; EP-A-0 393 495; EP-A-0 415 082; EP-A-0 199 742; EP-A-0 422 567 in the name of the same Applicant.

According to a first type of prior art joints, a joint assembly comprises a tubular elastic sleeve which is made of a heat-shrinkable material (and therefore referred to, as mentioned above, as heat-shrinkable sleeve), as described, for example, in document U.S. Pat. No. 4,383,131. The heat-shrinkable sleeve is arranged around one end of a cable and then an electric connection is formed between the metal conductors of the cables to be spliced. Subsequently, the sleeve is axially centered on the splicing zone and is finally shrunk around said splicing zone by means of heat, e.g. in the form of a free flame. This means that the installation of a heat-shrinkable sleeve is risky, difficult and requires a lot of manual work.

Alternatively, according to a second type of prior art joints, a joint assembly comprises a tubular elastic sleeve which is fitted, in an elastically-dilated condition, on a removable hollow tubular supporting element which is made of a rigid plastic material (the elastic sleeve in this case being referred to as cold-shrinkable sleeve). The sleeve thus supported is arranged around one end of a cable and then an electric connection is formed between the metal conductors of the cables to be spliced. Subsequently, the sleeve is coaxially centered on the splicing zone and is finally shrunk around said splicing zone by removing the supporting element therefrom.

The above-mentioned joint assemblies are generally applied to cables placed in trenches dug in the ground or in narrow areas, which locations make the operation of removing the supporting element particularly laborious and awkward.

Additionally, in case the splicing of two electric cables of the multi-pole type (for example double-pole or triple-pole type) is performed, the application procedure described hitherto has to be repeated for each single phase of the two cables. Accordingly, the removal of a corresponding number of supporting elements (for example two in a double-pole cable or three in a triple-pole cable) is required, thus resulting in an even more laborious removing operation.

The supporting element(s) can be removed from the cold-shrinkable sleeve(s) by using different methods depending on the structure of the supporting element(s).

For example, the surface of the tubular supporting element may be provided with a helical incision to define a plurality of adjacent coils of a strip-like element so that, when a pulling force is exerted on a free end portion of said strip-like element, the tubular supporting element, due to a gradual separation of the coils, is made to collapse. In so doing, the tubular sleeve elastically contracts, thus gripping the cables at the splicing zone. Embodiments of said supporting elements are described, for example, in documents EP-A-0 541 000; EP-A-0 735 639; EP-A-0 547 656; EP-A-0 547 667 in the name of the same Applicant.

Document U.S. Pat. No. 6,472,600—in the name of the same Applicant—discloses a joint assembly which comprises: a tubular rigid supporting element consisting of two supporting portions, a tubular cold-shrinkable pre-expanded sleeve, and a fastening means for temporarily connecting the two supporting portions to the tubular sleeve. According to an embodiment described in said document, the fastening means comprises two longitudinal straps connecting the outer edges of said supporting portions. The longitudinal straps, which retain axially arranged and associated to each other the two supporting portions, are cut when the supporting portions have to be expelled for allowing the tubular sleeve to collapse onto the splicing zone. Additionally, document U.S. Pat. No. 6,472,600 further discloses the provision of an annular clamping strap around one of the supporting portions in order to allow the expulsion thereof in two distinct subsequent moments. The supporting portion retained by this annular strap, in fact, is expelled only once the annular strap is cut. Subsequently to the cutting of such annular strap, the thrust exerted by the retractable sleeve collapsing onto the supporting portions causes an expulsion of the latter. In this case, the retractable sleeve may be defined as "self-expellable", in the sense that—the expulsion of the supporting portions starts once the supporting portions are not retained anymore by any retaining element and are both free to separate from the sleeve, and subsequently proceeds in an automatic manner.

Moreover, according to a farther embodiment described in document U.S. Pat. No. 6,472,600, the two supporting portions may comprise a frusto-conical portion, the slightly tapered shape of which allows the supporting portions—once released by the fastening means—to be easily expelled by the thrust exerted by the collapsing retractable sleeve on the supporting portions. According to said document, the self-expelling operation of the supporting portions is even more positively influenced by the presence of a lubricating material which can be applied between the supporting element and the tubular elastic sleeve, preferably said lubricating material being a grease which does not flow under the action of the pressure exerted by the shrinkable tubular sleeve when this collapses onto the splicing zone.

The Applicant has noticed that the self-expulsion of the supporting portions of a cold-shrinkable joint assembly of the prior art can give rise to an undesired formation of air pockets between the cables and the tubular elastic sleeve collapsing thereonto.

The formation of air pockets in correspondence of the splicing zone is particularly dangerous since they can promote partial discharges during the service life of the cable, said partial discharges irreversibly damaging the cable and causing failure thereof. This phenomenon is particularly exacerbated when high voltage cables are concerned.

In details, the Applicant has noticed that, according to the prior art joint assemblies comprising a fastening means, when the latter is released and the collapsing of the tubular elastic sleeve is started, the supporting portions are expelled away from the splicing zone by the force exerted on the same by the tubular elastic sleeve collapsing onto the cable. According to said prior art joint assemblies, as described above, the expulsion of the supporting portions—due to the thrust exerted by the tubular elastic sleeve—occurs automatically and no means is provided to control and/or modify the expulsion speed of the supporting portions.

Moreover, in case a lubricant is provided between the tubular elastic sleeve and the supporting portions in order to facilitate the expulsion thereof, during the self-expulsion of the supporting portions, the uncontrolled expulsion speed of the supporting portions can cause the formation of lubricant agglomerations at the interface between the tubular sleeve and the cables, said lubricant agglomerations giving rise to an unacceptable worsening of the cable joint quality. In particular, a decrease of the electrical properties of the interface between the tubular sleeve and the cables is likely to occur. Generally, in fact, said lubricant agglomerations incorporate air pockets which, as mentioned above, can provoke partial discharges.

SUMMARY OF THE INVENTION

The Applicant has perceived that the formation of defects, such as the undesired air pockets mentioned above, generally occurs when the expulsion speed of the supporting portions is excessive with respect to the recovering speed of the elastic tubular sleeve.

In particular, the Applicant has perceived that said air pockets generally form when the expulsion of the supporting portions does not gradually follow the collapsing of the tubular elastic sleeve, so that an irregular shrinkage thereof may occur. For instance, in the case the supporting portions are already expelled while the tubular elastic sleeve is still collapsing onto the cables because of the elastic behavior of the material, since the sleeve is no more supported by the supporting portions, it may occur that a sleeve portion, which is axially far from the splicing zone, collapses onto the cables sometime before a sleeve portion which is axially close to the splicing zone. In such a situation, the collapsing of the tubular elastic sleeve does not occur regularly and gradually from the central portion of the splicing zone to the axially outer portions thereof, thereby causing air entrapment between the tubular sleeve and the cables and thus the formation of the air pockets mentioned above.

The Applicant has thus perceived that, in order to overcome the above-mentioned drawbacks deriving from the formation of air pockets between the sleeve and the cables, it is necessary to ensure that the shrinkage of the tubular elastic sleeve onto the splicing zone gradually and regularly occurs from the central portion of the splicing zone towards the axially outer portions thereof.

The Applicant has found that such a result can be obtained by adapting the expulsion speed of the supporting portions—during the collapsing of the tubular sleeve onto the cables—to the actual shrinkage speed of the tubular elastic sleeve, i.e. by selecting the suitable expulsion speed of the supporting portions as a function of the shrinkage speed of the tubular elastic sleeve which, in turn, is a function of the recovering speed of the elastic material the tubular sleeve is made of.

In details, the Applicant has found that, by controlling the expulsion speed of the supporting portions, the axial displacement thereof can be adjusted in accordance with the recovering speed of the elastic tubular sleeve. In so doing, the collapsing of the tubular sleeve along the length of the cable is caused to occur uniformly and only in one direction, i.e. from the axially central portion of the splicing zone towards the axially outer portions thereof, so that a possible collapsing of sleeve portions, which are located downstream of sleeve portions not yet collapsed, can be advantageously avoided. In the present description, the term "downstream" is referred to a position—along the expulsion direction—which is axially outer with respect to the central (i.e. inner) portion of the splicing zone.

In particular, the Applicant has found that the step of adjusting (preferably, reducing) the expulsion speed of the first and second supporting portions (i.e. the step of adjusting the axial displacement of said supporting portions) can be carried out in such a manner that the expulsion speed of said supporting portions is substantially proportional to the recovering speed of the elastic material of the tubular sleeve while collapsing onto the splicing zone.

This means that, according to the method of the present invention, the expulsion speed of the supporting portions can be advantageously adjusted as a function of the elastic properties of the material the tubular sleeve is made of. Therefore, the present method allows to take into account the changes in the elastic properties that the sleeve material can undergo, for example during the storage of the tubular sleeve before installation thereof, as a consequence of several factors, such as long storage periods or particular environmental conditions which might take place during said storage periods or in any moment preceding the installation of the sleeve and the ensuing splicing of the cables. Said factors can remarkably modify the elastic recovering of the sleeve material. A further factor which has to be taken into account is the environmental temperature at the time of installation (especially in case the environmental temperature is lower than 10° C.), a decrease of the environmental temperature tending to reduce—even to a remarkable extent—the shrinkage speed of the tubular sleeve.

In a first aspect, the present invention relates to a method for splicing a first electric cable and a second electric cable comprising respective conductors, said method comprising the steps of:

providing a tubular elastic sleeve supported in a radially expanded condition on a removable hollow supporting element detachable in a first supporting portion and a second supporting portion, placing said sleeve fitted on said supporting element substantially coaxially with one of said first electric cable and said second electric cable and radially external thereto, forming an electric connection between said conductors thereby obtaining a splicing zone, placing said sleeve fitted on said supporting element substantially coaxially with said splicing zone and radially external thereto, triggering an axial displacement of said first and second supporting portions so as to start an elastic recovering of the tubular sleeve onto said splicing zone capable to expel said first and second supporting portions from the sleeve at an expulsion speed, and adjusting said expulsion speed of the first and second supporting portions away from said splicing zone so as to adapt the expulsion speed of said first and second supporting portions to said elastic recovering of the tubular sleeve.

In this way, and in particular thanks to the provision of the above-mentioned adjusting step, the expulsion speed of the supporting portions can be advantageously modified so as to take account of the actual elastic properties of the tubular sleeve being installed.

The expression "axial displacement", as better described in the following, is used to indicate any displacement of the supporting portions with respect to the tubular sleeve, such an expression meaning therefore a substantially simultaneous displacement of the two supporting portions with respect to the tubular sleeve or a displacement of one of the two supporting portions with respect to the tubular sleeve (therefore, the two supporting portions are displaced from the tubular sleeve in two subsequent steps).

According to a preferred embodiment of the method of the invention, the supporting element comprises a first supporting portion and a second supporting portion which are axially arranged and detachably constrained to each other, the step of triggering the axial displacement of said first supporting portion and second supporting portion comprising the step of reciprocally detaching said supporting portions.

Therefore, according to said preferred embodiment, once the supporting element fitted with the tubular elastic sleeve is positioned in correspondence of the splicing zone, the first and second supporting portions are suitably disconnected from each other, thereby causing an initial axial displacement thereof, so that an initial shrinkage of the tubular sleeve onto the splicing zone is caused to occur. Subsequently, thanks to the adjusting step of the method of the present invention, the expulsion speed of said first and second supporting portions (whether simultaneous or not)—governed by the elastic properties of the tubular sleeve during the elastic recovering thereof—is suitably adjusted so that the shrinkage of the tubular elastic sleeve onto the splicing zone is smoothly carried out from the central (inner) portion of the splicing zone outwards.

According to an alternative embodiment of the method of the present invention, the supporting element is made of a single piece which is provided with a frangible zone allowing an easy rupture of the supporting element into two distinct supporting portions. Preferably, said frangible zone is positioned along a cross-section of said supporting element and is formed of a plurality of slots or spot welds (as disclosed in document U.S. Pat. No. 6,472,600). Preferably, the rupture of said supporting element is obtained by applying a relative rotation, or a predetermined tensile force or flexure at the axial ends of the supporting element. Preferably, said frangible zone is provided in a predetermined position of the supporting element so as to form either two symmetrical first and second supporting portions, which conveniently allows to expel the same from the sleeve in a substantially simultaneous manner, or two asymmetrical first and second supporting portions, which conveniently allows to expel the same from the sleeve at different time instants, according to the needs of the specific application.

According to the above-mentioned alternative embodiment based on a single piece, breakable supporting element, once the supporting element fitted with the tubular elastic sleeve is positioned in correspondence of the splicing zone, the method of the present invention comprises the step of causing the single piece supporting element to be divided into two distinct supporting portions.

Once the first and the second supporting portions are axially displaced from one another, and therefore start to be expelled from the sleeve, the method of the present invention comprises the step of adjusting the expulsion speed of the supporting portions, for example by distinctly acting on the first and the second supporting portions and by distinctly controlling the expulsion speed thereof.

Preferably, said first and second supporting portions are simultaneously expelled from the tubular elastic sleeve.

Alternatively, said first and second supporting portions are expelled from the tubular elastic sleeve at different time instants, for example by retaining a first one of the two supporting portions until a second one is completely expelled from the sleeve. In other words, according to this alternative embodiment, the method further comprises the steps of retaining a first supporting portion by means of a retaining device, such as for example an annular strap, until the expulsion of a second supporting portion is terminated, and of subsequently removing the retaining device so as to allow the expulsion of the first supporting portion as well.

Accordingly, the adjusting step is preferably carried out on said first and second supporting portions at different time instants, in the sense that a first adjustment of the expulsion speed is carried out on a first supporting portion being expelled from the sleeve, followed by a second adjustment of the expulsion speed on a second supporting portion being expelled from the sleeve.

For example, supposing that the supporting portions are expelled at different time instants and that the second supporting portion is the first one to be expelled from the sleeve, a preferred embodiment of the method of the invention may comprise the subsequent steps of:

- axially displacing the first and the second supporting portions from each other while retaining the first supporting portion in a temporary rest position;
- adjusting the expulsion speed of the second supporting portion,
- removing the retainment from the first supporting portion to be expelled, and
- adjusting the expulsion speed of the first supporting portion.

Alternatively, and particularly when both supporting portions are expelled in a substantially simultaneous manner, the adjusting step is preferably carried out in a substantially simultaneous manner on both the above-mentioned first and second supporting portions.

Thus, independently of the kind of sequence of expulsion of the two supporting portions (whether simultaneous or not), according to the method of the invention the expulsion speed is adjusted so as to take into account the elastic recovering properties of the sleeve.

According to a preferred embodiment of the present invention, said adjusting step comprises the step of setting the expulsion speed of said first and second supporting portions to be substantially proportional to the recovering speed of the elastic tubular sleeve. In other words, during the installing operations, the expulsion speed of said first and second supporting portions is continuously adjusted and set at a predetermined value which takes into account the actual shrinkage speed of the tubular sleeve. This means that during installation the expulsion speed of the first and second supporting portions is made compatible with the actual recovering speed of the tubular sleeve, which depends on the elastic recovering properties of the tubular sleeve at the time of the installation, these properties being function of the intrinsic elastic properties of the sleeve, as well as of the environmental conditions experienced both during the storage preceding the installation and during the installation itself.

According to a further preferred embodiment of the method of the present invention, the adjusting step comprises the step of reducing the expulsion speed of said first and second supporting portions.

According to a further preferred embodiment of the method of the present invention, the step of adjusting the expulsion speed of the first and second supporting portions further comprises the step of reducing the expulsion speed of said first and second supporting portions up to zero. In other words, the above-mentioned adjusting step further comprises the step of stopping the axial displacement of said first and second supporting portions.

Preferably, the above-mentioned step of stopping the axial displacement of said first and second supporting portions is carried out in the first instants of the installation. In this way, it is advantageously possible to verify the correct axial position of the tubular sleeve with respect to the splicing zone after an initial expulsion of the supporting portions. In fact, although the method of the invention involves a step of placing the sleeve fitted on the supporting element substantially coaxially with and radially external to the splicing zone, a possible asymmetrical axial displacement of the supporting portions may alter the axial alignment between the tubular sleeve and the splicing zone. This misalignment can be advantageously eliminated by carrying out the above-mentioned step of stopping the axial displacement of said first and second supporting portions and by placing again the sleeve fitted on the supporting element substantially coaxially with the splicing zone.

Preferably, the adjusting step comprises the step of constraining the outer end of said first supporting portion to the outer end of said second supporting portion.

In the present description and in the following claims, the term "outer end" of the supporting portions indicates the leading ends of said supporting portions along the expulsion direction.

In the present description and in the following claims, the term "inner end" of the supporting portions indicates the trailing ends of said supporting portions along the expulsion direction.

By constraining the outer end of the first supporting portion to the outer end of the second supporting portion, it is advantageously possible to adjust, for example to reduce, the expulsion speed of the supporting portions.

Preferably, the outer end of the first supporting portion and the outer end of the second supporting portion are constrained by means of at least one substantially inextensible strip. According to said preferred embodiment, by fastening a first end of said strip to the outer end of the first supporting portion and by fastening a second end of said strip to the outer end of the second supporting portion, it is advantageously possible to adjust the expulsion speed of said supporting portions by acting on an intermediate portion of said strip so as to pull or to release at least one end of the strip, thereby advantageously allowing to stop, slow down or increase—as the case may be—the axial displacement of at least one of the two supporting portions with respect to the splicing zone.

For example, if the supporting portions are displaced in a substantially simultaneous manner, both ends of the strip are preferably pulled either to stop the displacement at the beginning of the installation if the correct axial position of the tubular sleeve with respect to the splicing zone is to be checked, or to slow down the displacement whenever the expulsion speed in absence of any control would be excessive.

Preferably, the above-mentioned step of adjusting the expulsion speed of the supporting portions is cared out by providing a pair of longitudinal substantially inextensible strips, each strip end being fastened to a respective outer end of the supporting portions. In such a manner, the expulsion speed of the supporting portions can be advantageously adjusted by acting on the free ends of said strips.

According to a preferred embodiment, the method of the present invention further comprises the step of tensioning said at least one substantially inextensible strip before the step of triggering the axial displacement of the first and second supporting portions is carried out.

According to a preferred embodiment, the method of the present invention further comprises the step of tensioning said at least one substantially inextensible strip during the step of triggering the axial displacement of the first and second supporting portions.

In this manner, an excessive acceleration of the supporting portions is advantageously avoided from the very beginning of the shrinkage of the tubular sleeve onto the cables.

According to a preferred embodiment of the method of the present invention, subsequently to the above-mentioned tensioning step, the adjusting step further comprises the step of gradually releasing said at least one substantially inextensible strip. In this manner, the at least one substantially inextensible strip is firstly tensioned and then gradually released.

Preferably, said releasing step is carried out by acting on a locking member which engages said at least one substantially inextensible strip.

In such manner, by providing a locking member which keeps said strip tensioned and which is capable of releasing the same in a gradual manner, it is possible to simply and effectively adjust the axial displacement of the supporting portions, and thus to suitably adjust the expulsion speed thereof.

Preferably, the method of the present invention further comprises, before the above-mentioned step of forming the electric connection, the step of processing the ends of said electric cables so as to expose, over a predetermined length, the cables constitutive elements.

Once the first and the second supporting portions have been completely expelled from the sleeve, the method of the present invention preferably further comprises the step of removing said supporting portions from the spliced cables, e.g. by cutting.

Preferably, the method of the present invention farther comprises the step of providing a tubular metal braid in a radially external position with respect to said tubular elastic sleeve so as to restore the metal screens of the spliced cables. Alternatively, the tubular metal braid is part of said tubular elastic sleeve.

Preferably, the method of splicing of the present invention comprises the step of providing an outer polymeric sheath in a radially external position with respect to said tubular metal braid so as to restore the outer polymeric protective sheaths of the spliced cables. Alternatively, the outer polymeric sheath is part of said tubular elastic sleeve.

In a second aspect, the present invention relates to a joint assembly for splicing a first electric cable and a second electric cable, said joint assembly comprising:

a removable hollow supporting element detachable in a first supporting portion and a second supporting portion axially displaceable from each other, a tubular elastic sleeve supported in a radially expanded condition on said supporting element, and at least one expulsion speed controller for adjusting the expulsion speed of the first and second supporting portions from said sleeve.

Preferably, the expulsion speed controller comprises at least one substantially inextensible strip associated to the supporting portions, preferably to the outer ends thereof.

Preferably, a first end of said at least one substantially inextensible strip is associated to the outer end of the first supporting portion and a second end of said at least one substantially inextensible strip is associated to the outer end of the second supporting portion.

More preferably, the expulsion speed controller comprises at least one first substantially inextensible strip and at least one second substantially inextensible strip, said at least one first substantially inextensible strip being associated to the outer end of the first supporting portion and said at least one second substantially inextensible strip being associated to the outer end of the second supporting portion.

Preferably, the inextensible strips associated to the same supporting portion are angularly staggered from each other.

More preferably, the inextensible strips associated to the same supporting portion are equally angularly staggered from each other so that the expulsion of the supporting portions is carried out in a symmetrical way on each supporting portion by exerting a modulated stopping or releasing action along the whole periphery thereof.

The expulsion speed controller further comprises at least one locking member for tensioning and gradually releasing said at least one substantially inextensible strip. Preferably, said locking member is located at an intermediate portion of said at least one substantially inextensible strip. In such manner, a symmetry in the control of the expulsion speed of the supporting portions is advantageously attained.

According to a preferred embodiment of the joint assembly of the present invention, the locking member comprises a clamp, which preferably includes a pair of jaws defining therebetween a clearance within which the at least one substantially inextensible strip—associated to the supporting portions—is engaged. The closing of said clamp jaws allows to reduce the clamp clearance so that the at least one substantially inextensible strip can be advantageously stopped, while the opening of the clamp jaws allows to increase the clearance so that the at least one substantially inextensible strip can be advantageously released. In this way, whenever the expulsion speed of the supporting element(s) has to be increased or reduced (up to zero, if necessary) in order to follow the elastic recovering of the tubular sleeve, the technical staff involved in the splicing operation has simply to open or, respectively, to close the locking member as the case may be in order to adapt the expulsion speed of the supporting elements to the shrinkage speed of the tubular sleeve.

Preferably, the expulsion speed controller comprises a plurality of locking members engaging said at least one first substantially inextensible strip and said at least one second substantially inextensible strip.

More preferably, the expulsion speed controller comprises two locking members respectively engaging a first and a second substantially inextensible strip.

According to a preferred embodiment of the joint assembly of the present invention, if one locking member is provided, this is preferably arranged in such a manner to act simultaneously on a first substantially inextensible strip (e.g. associated to the outer end of the first supporting portion) and on a second substantially inextensible strip (e.g. associated to the outer end of the second supporting portion).

According to a further preferred embodiment of the joint assembly of the present invention, a single locking member may also act simultaneously on two pairs of first and second strips, thus conveniently minimizing the number of locking members, rendering the joint assembly of the present invention easier to be installed and operated, as well as reducing the costs thereof.

For instance, by providing the joint assembly of the present invention with two locking members, each locking member acting on two pairs of first and second substantially inextensible strips, it is advantageously possible to adjust the expulsion speed of the first and second supporting portions by acting on said two locking members only, while the release of said supporting portions is carefully modulated by four pairs of first and second strips.

Preferably, said strips are made of a thermoplastic polymer material. Preferably, said thermoplastic polymer material is a polyester or a polyolefin, such as for example polyethylene (PE) or polypropylene (PP). Alternatively, said strips are made of metal, such as for example steel.

Preferably, the expulsion speed controller comprises at least one longitudinal strap which axially constrains the outer ends of the first and second supporting portions, said at least one longitudinal strap being not engaged by the locking member mentioned above. Preferably, said at least one longitudinal strap has the function of providing that the at least one substantially inextensible strip is tensioned only during the installation so that tensioning thereof can be avoided for instance during storage of the joint assembly.

According to said preferred embodiment, said longitudinal strap is intended to be broken, e.g. by cutting, before operating the expulsion speed controller.

Preferably, the removable supporting element is substantially tubular in shape.

According to a preferred embodiment of the joint assembly of the present invention, the supporting element is substantially cylindrical in shape.

Preferably, the supporting element is substantially circular in cross-section.

Alternatively, the supporting element is substantially elliptical in cross-section.

According to a further embodiment of the joint assembly of the present invention, the supporting element is substantially frusto-conical in shape.

According to a preferred embodiment of the joint assembly of the present invention, the supporting element consists of two supporting portions axially arranged to face each other in correspondence of the inner ends thereof said supporting portions being detachably connected to each other.

Preferably, the first and second supporting portions forming said supporting element are frusto-conical in shape. More preferably, said first and second supporting portions are provided with tapered inner ends so that the diameter of the supporting portions is reduced in correspondence of the central portion of the splicing zone. The provision of a frusto-conical shape, especially at the inner ends of the supporting portions, advantageously facilitates the expulsion thereof.

According to an embodiment of the present invention, the supporting element is made of a single piece which is provided with a frangible zone that allows an easy rupture of the supporting element into two distinct supporting portions.

Preferably, said frangible zone is circumferential in shape.

Preferably, said frangible zone consists of a plurality of slots or spot welds as described, for instance, in document U.S. Pat. No. 6,472,600.

Preferably, said frangible zone is provided in a predetermined position of the supporting element so as to form two symmetrical first and second supporting portions. Alternatively, said frangible zone is provided in a predetermined position of the supporting element so as to form two asymmetrical first and second supporting portions.

Preferably, a lubricant is applied between the supporting element and the tubular elastic sleeve, as described in document U.S. Pat. No. 6,472,600 in the name of the same Applicant.

Preferably, said lubricant is a grease which does not flow under the action of the pressure exerted by the tubular elastic sleeve when the latter is caused to collapse onto the splicing zone.

Preferably, said grease comprises a silicone or a polyalkylene glycol, advantageously added with a filler comprising, for example, talc in proportion of from 15 to 35% by weight and containing preferably at least one pressure-withstanding additive, such as for example boron nitride in proportion of from 2 to 10% by weight.

Preferably, the tubular elastic sleeve comprises an electric insulating layer.

Preferably, the tubular elastic sleeve farther comprises a semiconductive layer surrounding said electric insulating layer.

Preferably, the joint assembly of the present invention further comprises a tubular elastic outer sheath in a position which is radially external with respect to said tubular elastic sleeve. Said outer sheath principally has an advantageous protective function so that the inner portions of the joint assembly are suitably protected against moisture and/or water.

Preferably, the joint assembly of the present invention further comprises a tubular metal braid which is positioned around said tubular elastic sleeve. The tubular metal braid has the advantageous function of restoring the metal screens of the spliced electric cables. Preferably, the tubular metal braid is positioned between the tubular elastic sleeve and the tubular elastic outer sheath. Preferably, the metal braid is made of tin-coated copper wires or strips. Preferably, the metal braid is applied starting from the exposed metal screen portion of the first cable and terminating on the exposed metal screen portion of the second cable.

According to a first embodiment of the joint assembly of the present invention, particularly suitable for splicing medium voltage electric cables, the tubular elastic sleeve preferably comprises, from the radially inner layer to the radially outer layer thereof: an electric field control element, an insulating layer and a semiconductive layer.

According to said first embodiment, the tubular elastic sleeve may further comprise the tubular metal braid mentioned above. According to said first embodiment, the tubular metal braid is radially external with respect to the semiconductive layer mentioned above.

According to said first embodiment, the tubular elastic sleeve may further comprise the tubular elastic outer sheath mentioned above. According to said first embodiment, the tubular elastic outer sheath is radially external with respect to the tubular metal braid mentioned above.

The electric field control element is a high relative dielectric constant element. Preferably, said element is made of a material having a relative dielectric constant $\in$ in the range from 6 to 20.

The splicing zone where the conductors of the electric cables are spliced can be filled with an electric-field control material.

According to a second preferred embodiment of the joint assembly of the present invention, particularly suitable for splicing high voltage electric cables, the tubular elastic sleeve preferably comprises, from the radially inner layer to the radially outer layer thereof: a first semiconductive element (generally indicated as "electrode") which surrounds the splicing zone; two second semiconductive elements (generally indicated as "deflectors"), each of them being arranged at axially opposite sides with respect to said first semiconductive layer; an electric insulating layer surrounding said first and second semiconductive elements; and a third semiconductive layer in a radially outer position with respect to said electric insulating layer and connected to the outer semiconductive layers of the cables to be spliced so as to restore the electrical continuity thereof.

The "electrode" is a voltage distribution element that is positioned, generally as a tubular shield, in correspondence of the spliced ends of the cables and partially covers the insulating layers thereof. The electrode is made of a semiconductive material and creates a Faraday's cage at constant potential to annul the effects due to the presence of air and to any shape irregularities of the metal connector at the splicing zone.

The second semiconductive element has the function of uniformly distributing the flow lines of the electrical field in correspondence of the cut ends of the outer semiconductive layer of the spliced cables. In details, each second semiconductive element consists of a cup-shaped stress control screen which is positioned at the axial ends of the electric insulating layer.

BRIEF DESCRIPTION OF THE DRAWINGS

Further details will be illustrated in the description which follows, with reference to the appended drawings, in which.

DETAILED DESCRIPTION OF THE PREFERRED EMBODIMENTS

In the following detailed description and in the figures associated thereto, for illustrative purposes reference will be made to a method and to a joint assembly for splicing two high voltage electric cables for conveying or supplying electric energy. Although reference will be made to this particular embodiment of the present invention, it has to be emphasized that the present invention can be applied to any electric connection forming part of an electric and/or telecommunication network as well as to any electric connection between a cable and an electric apparatus, e.g. a termination.

Furthermore, the constitutive elements of the joint will not be described in details since they are conventional per se and well known in the art.

With reference to FIG. 1-4, a joint assembly for splicing two high voltage electric cables 1 and 2 according to the invention is generally indicated at 12.

Figure 4:
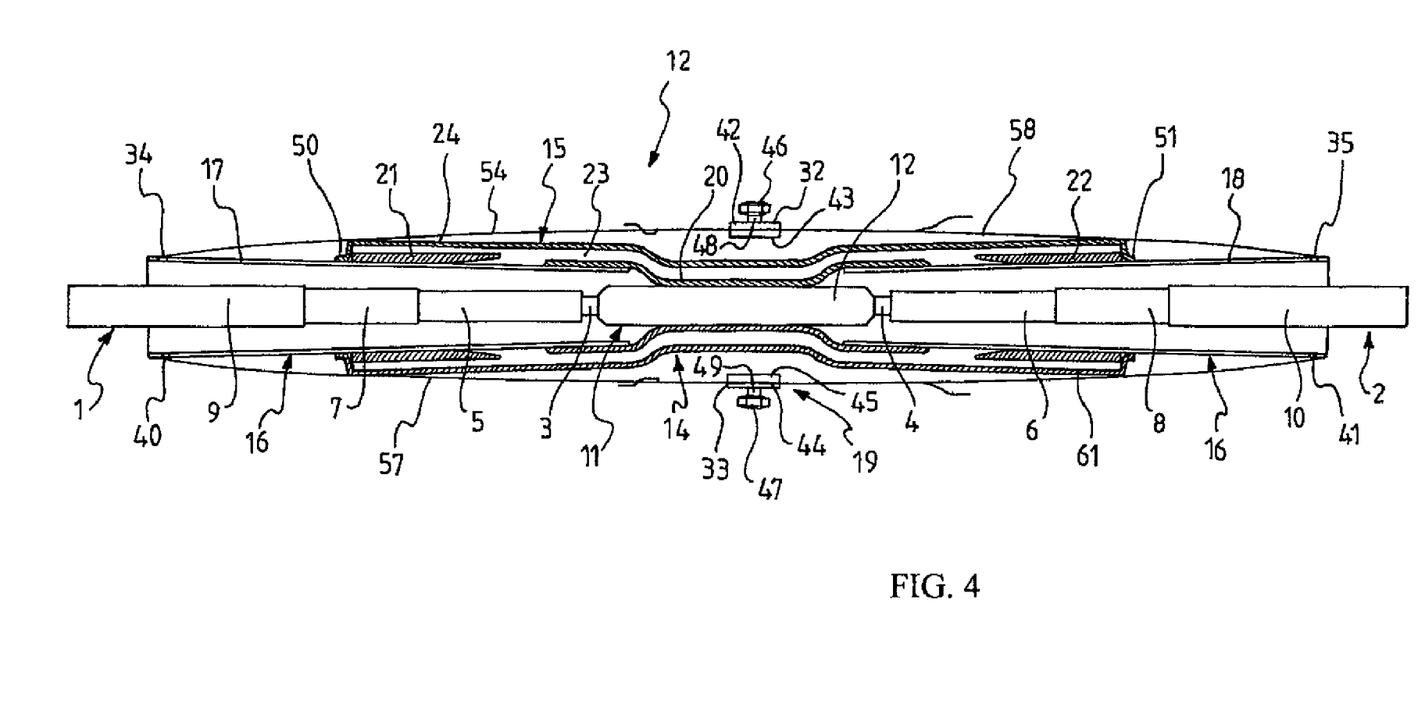
FIG. 4 is a lateral view, in partial longitudinal cross-section, of the joint assembly of FIG. 1 applied on said two electric cables and represented during the expulsion of the supporting portions as illustrated in FIG. 3.

As better shown in particular in FIG. 4, cables 1 and 2 are provided with a metal conductor 3 and, respectively, a metal conductor 4 which are surrounded—from the radially innermost position to the radially outermost position—respectively by an inner semiconductive layer (not shown), an electric insulating layer 5, 6, and an outer semiconductive layer 7, 8. In the following description, said assembly of cable constitutive elements will be indicated with the term of "cable core".

Preferably, the conductors 3, 4 are formed by at least two metal wires which are stranded together according to any conventional techniques. Alternatively, the conductors 3, 4 may be in the form of a metal rod. Whether made of stranded wires or of a rod, the conductors are preferably made of copper or aluminum.

In the following description, by way of illustrative example, reference is made to conductors 3, 4 in the form of rods.

The cross-sectional area of the conductors 3, 4 is determined as a function of the power energy to be transported at the selected voltage. Preferred cross-sectional areas for the cables according to the present invention are comprised from 16 mm$^2$ to 1,600 mm$^2$.

In the present description, the term "electric insulating material" is used to indicate a material having a dielectric strength of at least 5 kV/mm, preferably greater than 10 kV/mm. For high voltage power transmission cables, preferably the insulating material has a dielectric strength greater than 20 kV/mm, preferably from 20 to 50 kV/mm.

Typically, the insulating layers 5, 6 of the electric cables 1, 2 have a relative dielectric constant greater than 2, preferably from 2 to 5.

Preferably, the insulating layers 5, 6 are made of a polyolefin-based cross-linked polymer, in particular cross-linked polyethylene (XLPE), or elastomeric ethylene/propylene (EPR) or ethylene/propylene/diene (EPDM) copolymers, also cross-linked. Alternatively, said insulating layers 5, 6 may be made of a thermoplastic material comprising a thermoplastic polymer, preferably a polyolefin (e.g. polyethylene), and a predetermined amount of a dielectric liquid, preferably a synthetic oil (e.g. an aromatic, paraffinic or naphthenic oil).

The inner semiconductive layers (not shown) and the outer semiconductive layers 7, 8 are generally obtained by extrusion of a base polymeric material, for example a polyolefin (e.g. polyethylene), to which an electroconductive carbon black (e.g. electroconductive furnace black or acetylene black) is added so as to confer semiconductive properties to the base polymeric material.

In a radially outer position with respect to the above-mentioned cable core, the cables 1 and 2 are further provided with a metal screen (not shown), usually made of aluminum, lead or copper.

The metal screen may, for example, consist of a plurality of metal wires or tapes helically wound around the cable core. Alternatively, the metal screen may consist of a circumferentially continuous tube, such as a metal sheet which is formed longitudinally into a tubular shape by welding or sealing (e.g. by gluing) the lateral edges thereof in order to provide a barrier to moisture or to water ingress into the cable core.

In the following description, by way of illustrative example, reference is made to a metal screen in the form of metal wires.

The metal screen mainly performs the electric function of withstanding short-circuit currents. In case the metal screen is made in the form of a circumferentially continuous tube, the metal screen also provides hermeticity against water penetration in the radial direction. In this case, the metal sheet forming the metal screen is preferably folded lengthwise around the outer semiconductive layers 7, 8 with overlapping edges. Conveniently, a sealing and bonding material is preferably interposed between the overlapping edges so as to make the metal screen watertight. Alternatively, the metal sheet edges can be welded.

The electric cables 1 and 2 further comprise an outer polymeric sheath 9 and, respectively, 10, which are arranged in a radially outer position with respect to the respective cable metal screen.

The outer polymeric sheaths 9, 10 are preferably made of a polymer material, for example polyvinyl chloride (PVC) or polyethylene (PE), which has the function of mechanically protecting the cable core from the external environment. The thickness of the outer polymeric sheaths 9, 10 can be selected to provide the cables 1, 2 with resistance to mechanical stresses and impacts.

In FIG. 4, an electric splicing zone between the two electric cables 1, 2 is generally indicated at 11. The electric splicing zone 11 is obtained, as described in more detail in the following description of a preferred embodiment of the method of the invention, by splicing the conductors 3, 4 of the cables 1, 2.

Figure 1:
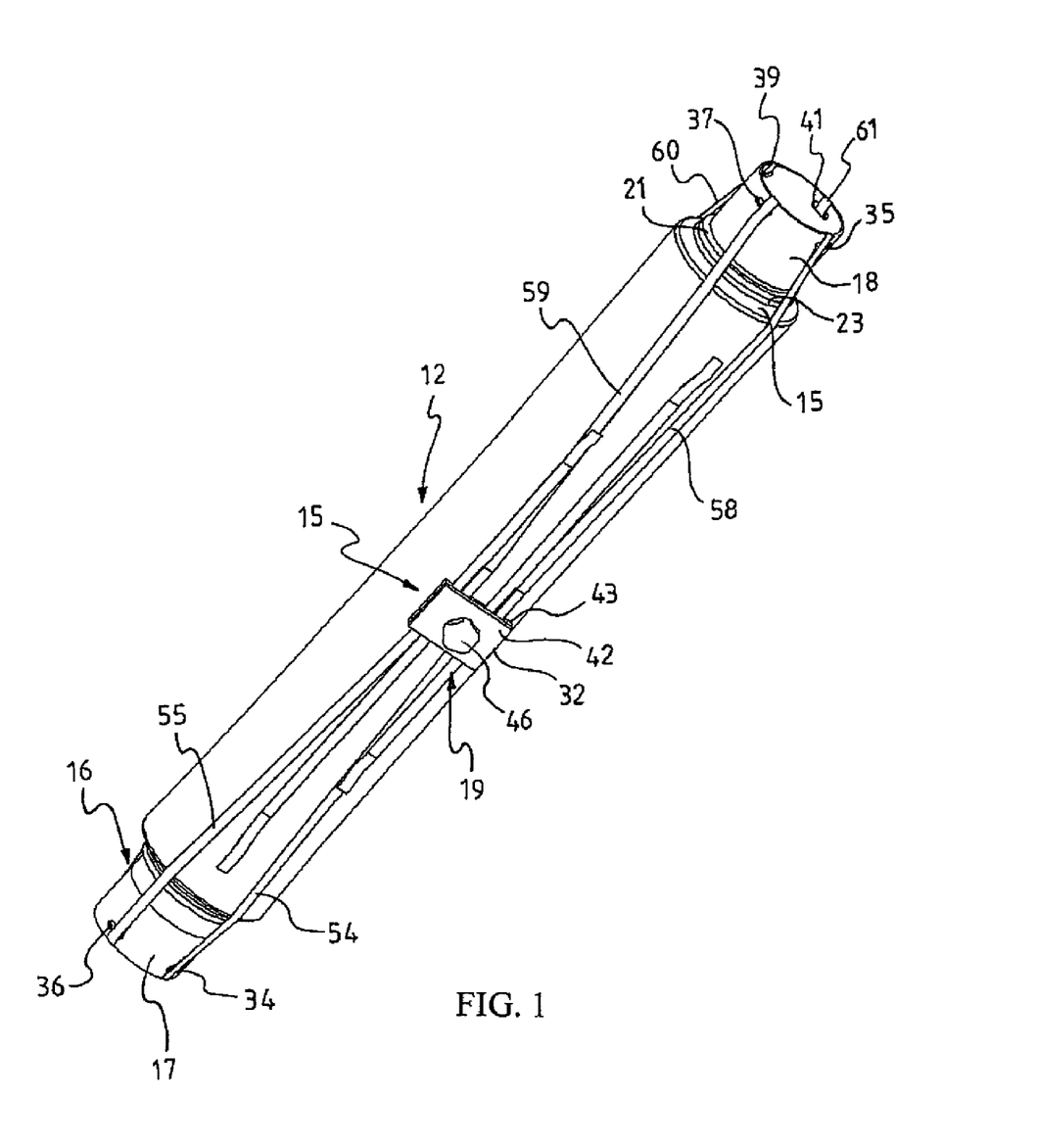
FIG. 1 is a perspective view of a joint assembly for splicing two high voltage electric cables according to the present invention.
Figure 2:
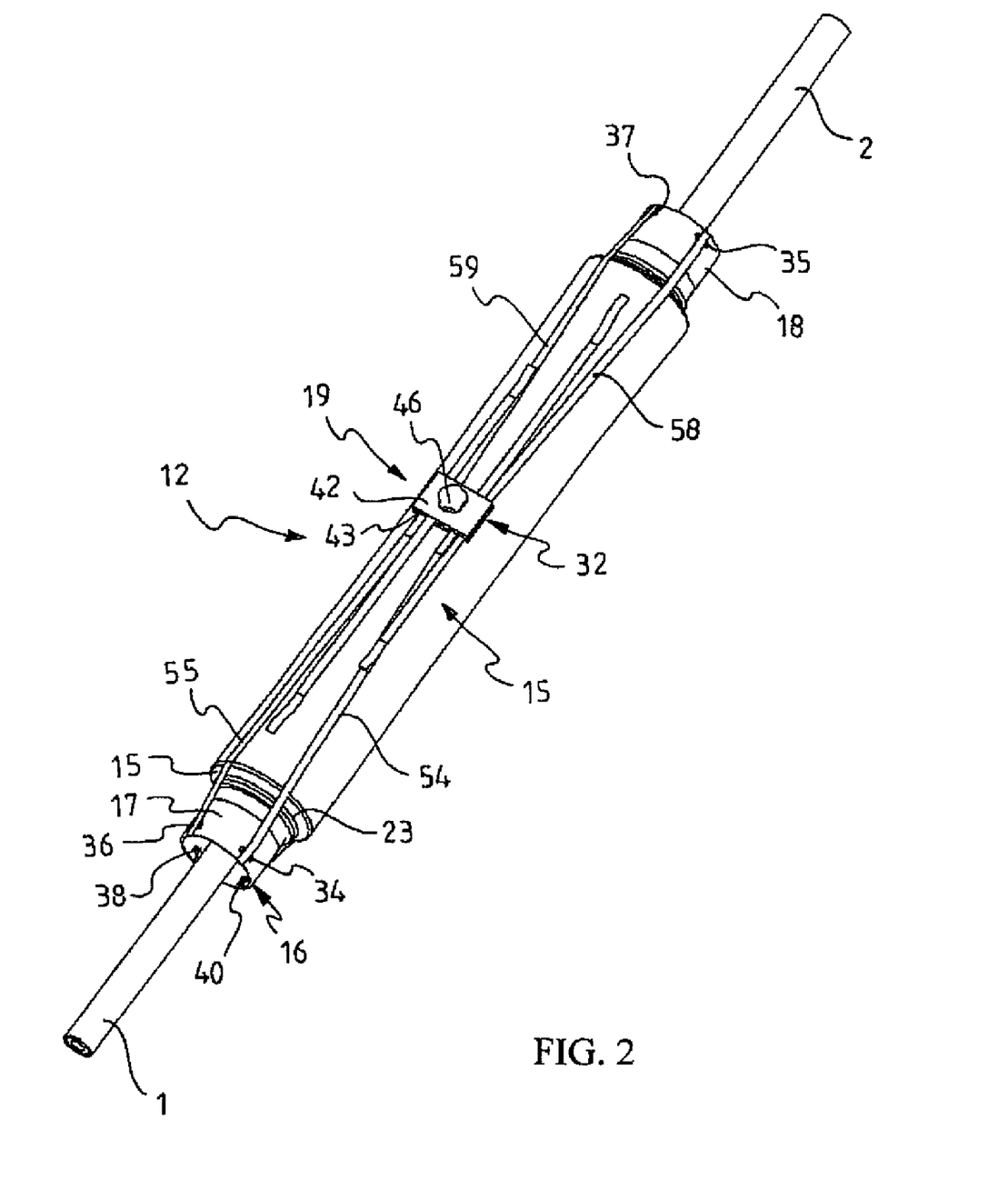
FIG. 2 is a perspective view of the joint assembly of FIG. 1 applied on said two electric cables and represented before the expulsion of the supporting portions from the sleeve.

The joint assembly 12 for splicing the high voltage electric cables 1, 2 according to the invention is shown in FIG. 1, while FIG. 4 shows said joint assembly 12 being fitted on the splicing zone 11 of the cables 1, 2.

The joint assembly 12 which is shown in the figures has the function of restoring the continuity of the electric insulating layers 5, 6 and of the outer semiconductive layers 7, 8 of the electric cables 1, 2. Therefore, the joint assembly 12 comprises a plurality of elements which are coaxially disposed and radially superimposed and which correspond to the cable constitutive elements.

In details, according to the invention, the joint assembly 12 comprises a removable hollow supporting element 16 which is detachable into a first supporting portion 17 and a second supporting portion 18 axially displaceable from each other.

The joint assembly 12 further comprises a tubular elastic sleeve 15 which is supported in a radially expanded condition on the supporting element 16.

In particular, as better illustrated in the following with reference to the description of a preferred embodiment of the method of the invention, the tubular sleeve 15 is intended to collapse onto the splicing zone 11 following the removal of the first supporting portion 17 and the second supporting portion 18 from the joint assembly 12.

The joint assembly 12 further comprises an expulsion speed controller 19 which adjusts the axial displacement of the first supporting portion 17 and of the second supporting portion 18, and in particular the expulsion speed thereof.

In order to restore the electric and mechanical continuity of the first high voltage electric cable 1 and the second high voltage electric cable 2, at the splicing zone 11, the tubular elastic sleeve 15 principally comprises, from the innermost radial position to the outermost radial position (see FIG. 4):

- a first semiconductive element 20, which is arranged around the supporting element 16 and substantially extends at the central position of the tubular elastic sleeve 15, in correspondence of the splicing zone 11;
- two second semiconductive elements 21, 22, which are arranged around the supporting element 16 on axially opposite sides with respect to the first semiconductive element 20;
- an electric insulating layer 23, which surrounds the first semiconductive element 20 and the second semiconductive elements 21, 22; and
- a third semiconductive element 24, in form of a layer, which is located in a radially outer position with respect to the electric insulating layer 23 and which connects— once the supporting element 16 has been removed—the outer semiconductive layer 7, 8 of the cables 1, 2.

The second semiconductive elements 21, 22 are preferably cup-shaped.

According to the preferred embodiment shown in the figures, the third semiconductive element 24 is preferably provided, at both ends thereof, with a lip 50, 51 (see FIG. 4) which is located in correspondence of the axially outer ends of the second semiconductive elements 21, 22 and which comes into contact with the supporting element 16.

According to the preferred embodiment shown in FIGS. 1-4, the supporting portions 17, 18 have a frusto-conical shape, the inner ends of which, i.e. the ends oriented towards the splicing zone 11, are tapered.

The joint assembly 12 is advantageously pre-assembled in a manufacturing plant and the tubular elastic sleeve 15 is supported in a radially stretched condition on the removable supporting element 16 (see FIG. 1, for example), as disclosed, for instance, in documents EP-A-0 541 000; EP-A-0 735 639; EP-A-0 547 656; EP-A-0 547 667 in the name of the same Applicant.

According to the preferred embodiment shown in FIGS. 1-4, the expulsion speed controller 19 comprises a plurality of pairs of substantially inextensible strips connected to the outer ends of the supporting portions 17, 18, each pair of strips including respectively a first strip and a second strip.

In particular, the expulsion speed controller 19 comprises (see FIG. 3) a plurality of first substantially inextensible strips 54-57 and a respective plurality of second substantially inextensible strips 58-61 connected respectively to the outer ends of the supporting portions 17, 18.

According to the embodiment shown in the figures, the expulsion speed controller 19 further comprises two locking members 32, 33, each of the latter keeping under tension and gradually releasing a pair of said plurality of first 54-57 substantially inextensible strips and a pair of said plurality of second 58-61 substantially inextensible strips.

As mentioned above, each pair of strips associates together the outer ends of the supporting portions 17, 18. For example, a first end of the strip 54 is fastened to the outer end of the first supporting portion 17, while a first end of the cooperating second strip 58 is fastened to the outer end of the second supporting portion 18. Analogously, a first end of the remaining first strips 55-57 are fastened to the outer end of the first supporting portion 17, while a first end of the cooperating second strips 59-61 are fastened to the outer end of the second supporting portion.

Preferably, the first strips 54-57 and the second strips 58-61 are fastened to the outer ends respectively of the first and second supporting portions 17, 18 through holes 34-41 provided in said outer ends of the first and second supporting portions 17,18.

The holes 34, 36, 38 and 40 provided on the first supporting portion 17—as well as the holes 35, 37, 39 and 41 provided on the second supporting portion 18—are conveniently staggered at a predetermined angle from each other.

According to the embodiment shown in FIGS. 1-4, the locking members 32, 33 respectively comprise clamps, each clamp comprising a pair of jaws 42, 43 and 44, 45, for example in the form of plates, which are parallel to each other. Preferably, said plates are provided with a threaded hole (not shown in details) which is engaged by a connecting element (e.g. a screw 48, 49) for adjusting the distance between the plates so as to lock or release the longitudinal strips 54-61 mentioned above. Preferably, said connecting element is operated by rotating clockwise or counter-clockwise a handle 46, 47.

Furthermore, the joint assembly 12 further comprises at least one longitudinal strap (not shown in the figures) which is not engaged by any of the above-mentioned locking members 32 and 33 and which axially constrains the outer ends of the first and second supporting portions 17, 18, so that the substantially inextensible strips 54-61 of the expulsion speed controller 19 are tensioned.

With reference to the joint assembly 12 described above and shown in the figures, a method according to the invention for splicing the first electric cable 1 and the second electric cable 2 will be described in the following.

According to a first step of the method of the invention, the sleeve 15 supported in a radially expanded condition on the removable supporting element 16 as described above is provided. Subsequently, the sleeve 15 fitted on the supporting element 16 is placed substantially coaxially with and radially external to one of the electric cables 1, 2, e.g. the joint assembly 12 is engaged around one end of one of said first electric cable 1 or of said second electric cable 2 and is parked thereon until the electric connection between the conductors 3, 4 of the electric cables 1, 2 has been formed and the splicing zone 11 has been obtained.

Before forming such electric connection between the conductors 3, 4, the ends of the two electric cables 1, 2 to be spliced are preferably firstly processed so as to expose, over a predetermined length thereof, the cables constitutive elements, i.e. the conductors 3, 4, the inner semiconductive layers, the electric insulating layers 5, 6, the outer semiconductive layers 7, 8, the metal screens and the external polymeric sheaths 9, 10.

Subsequently, the sleeve 15 fitted on the supporting element 16 is placed substantially coaxially with and radially external to the splicing zone 11. In other words, the joint assembly 12 is removed from the above-mentioned parking area defined on one end of one of the electric cables 1, 2 and positioned over the splicing zone 11 so that the central portion of the tubular elastic sleeve 15 is symmetrically located with respect to the splicing zone 11, as shown, for instance, in FIG. 4 (which however refers to a subsequent step of the method of the invention, the supporting portions 17, 18 being already displaced from each other in such figure).

At this point, in order to apply the tubular elastic sleeve 15 at the splicing zone 11, and, in this manner, to complete the splicing of the first and second electric cable 1, 2, the method of the present invention provides the further following steps.

An initial axial displacement of the first supporting portion 17 and of the second supporting portion 18 from the central portion of the splicing zone 11 is triggered. This initial axial displacement can be caused—by the staff personnel making the joint installation—by acting on the handles 46, 47 of the locking members 32, 33 so as to release the substantially inextensible strips 54-61. Alternatively, said initial axial displacement can be performed by cutting the at least one longitudinal strap (not shown in the figures).

Figure 3:
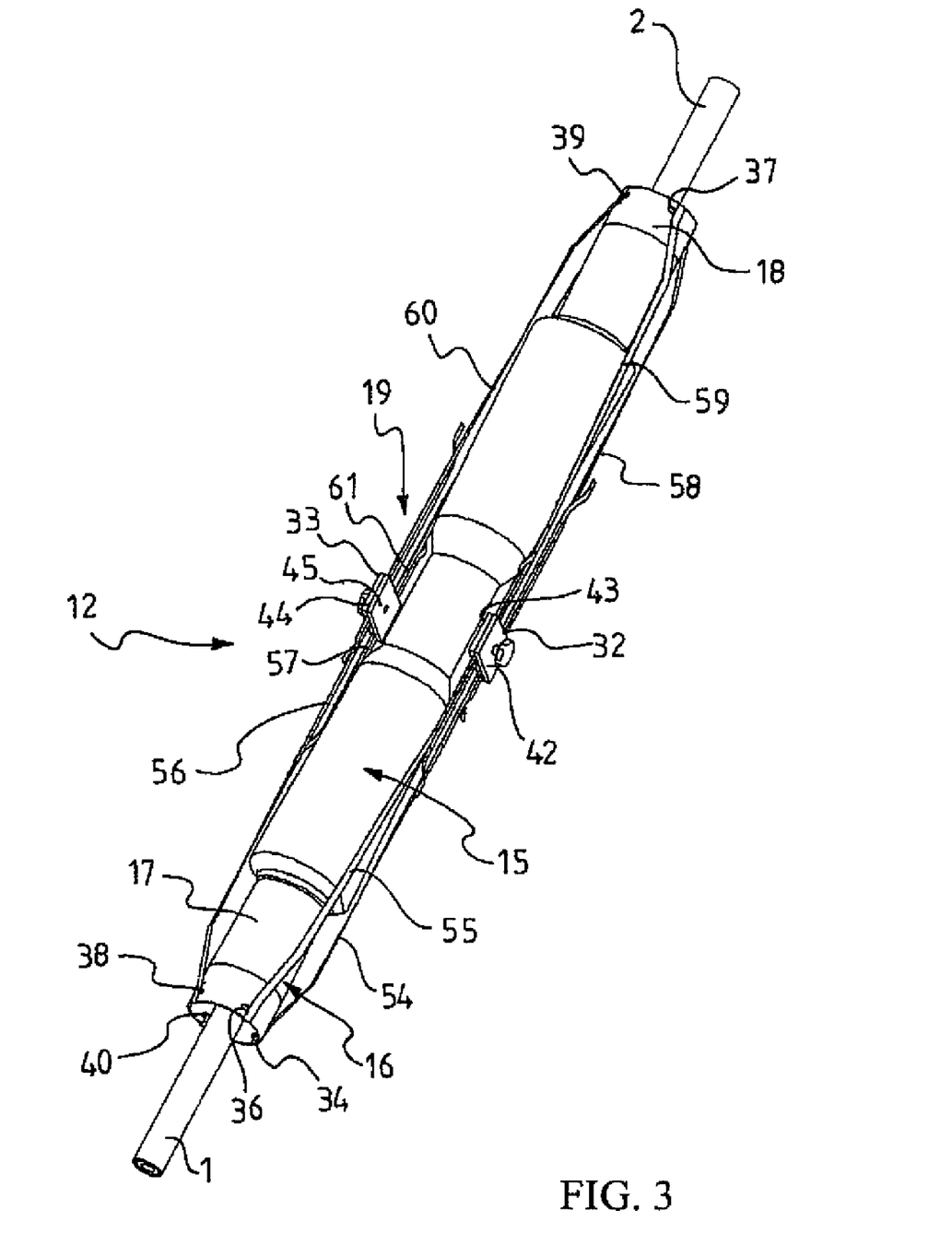
FIG. 3 is a perspective view of the joint assembly of FIG. 1 applied on said two electric cables and represented during the expulsion of the supporting portions from the sleeve.

As a consequence of this initial axial displacement of the first supporting portion 17 and of the second supporting portion 18, an elastic recovering of the central portion of the tubular elastic sleeve 15 onto the splicing zone 11 occurs, thus enabling to begin the expulsion of the first supporting portion 17 and of the second supporting portion 18 (as illustrated in FIGS. 3 and 4).

Subsequently, the expulsion speed of the first supporting portion 17 and of the second supporting portion 18 is adjusted by the technical staff by means of the expulsion speed controller 19 so that said expulsion speed is caused to follow the elastic recovering speed of the tubular elastic sleeve 15 until the first and second supporting portions 17, 18 are completely expelled and the tubular elastic sleeve 15 is completely collapsed onto the splicing zone 11.

According to the preferred embodiment shown in FIGS. 1-4, the expulsion speed of the first and second supporting portions 17, 18 is adjusted by suitably releasing the plurality of first 54-57 and second 58-61 substantially inextensible strips which constrain the outer ends of said first and second supporting portions 17, 18.

Moreover, according to the preferred embodiment shown in FIGS. 1-4, the adjustment of the expulsion speed of the first and second supporting portions 17, 18 is carried out by rotating the handles 46, 47 of the locking members 32, 33 of the expulsion speed controller 19, said rotation releasing or blocking the above-mentioned plurality of strips 54-57, 58-61.

Once the first and the second supporting portions 17, 18 have been completely expelled from the splicing zone 11, said supporting portions 17, 18 are removed from the spliced cables 1, 2 in any manner conventional per se, e.g. by cutting.

As already mentioned above, according to the embodiment shown in the figures, the splicing of the electric cables 1, 2 has to be completed by restoring the metal screens and the outer polymeric sheaths 9, 10 of said cables 1, 2.

For instance, the metal screens of the spliced cables can be restored by applying a tubular metal braid to connect the metal screen of cable 1 with the metal screen of cable 2. Preferably, the electric continuity between the cable metal screens and the tubular metal braid is completed by overlapping the metal braid onto the metal screens and by applying a fastener (not shown in the figures) onto the overlapping area. Preferably, said fastener is a metal clamp. More preferably, said fastener is a metal spring.

Finally, the external polymeric sheath can be restored by providing an elastic tubular sleeve—in a radially expanded condition—supported on a further supporting element. According to said embodiment, the outer polymeric sheath—held on the further supporting element—has to be engaged at one end of the first cable 1 or of the second cable 2 before the electric connection thereof occurs (i.e. in the same manner disclosed for the tubular elastic sleeve 15 of the joint assembly 12). Successively, once the tubular elastic sleeve 15 of the joint assembly 12 has been recovered onto the splicing zone 11 and the first and second supporting portions 17, 18 have been removed therefrom, the outer polymeric sheath is moved from the parking area onto the splicing zone 11 and is caused to collapse thereonto by expelling the farther supporting element in any conventional manner.

Therefore, a splicing zone between two electric cables can be advantageously obtained in an easy and effective manner.

In case two medium voltage electric cables have to be spliced (not shown in the figures), the tubular elastic sleeve preferably further comprises a tubular metal braid and an outer polymeric sheath so that the recovering of said sleeve onto the splicing zone restores all the constitutive elements of the cables to be spliced.

The invention claimed is:

1. A joint assembly (12) for splicing a first and a second electric cable (1, 2), comprising:
   a removable hollow supporting element (16) detachable in a first supporting portion (17) and a second supporting portion (18) axially displaceable from each other,
   a tubular elastic sleeve (15) supported in a radially expanded condition on said supporting element (16), and
   at least one expulsion speed controller (19) for adjusting the expulsion speed of the first and second supporting portions (17, 18) from said sleeve (15).

2. The joint assembly (12) according to claim 1, wherein said expulsion speed controller (19) comprises at least one substantially inextensible strip (54-61) associated to the supporting portions (17, 18).

3. The joint assembly (12) according to claim 2, wherein a first end of said at least one substantially inextensible strip (54-61) is associated to the outer end of the first supporting portion (17) and a second end of said at least one substantially inextensible strip (54-61) is associated to the outer end of the second supporting portion (18).

4. The joint assembly (12) according to claim 2, wherein said expulsion speed controller (19) comprises at least one first substantially inextensible strip (54-57) and at least one second substantially inextensible strip (58-61), said at least one first substantially inextensible strip (54-57) being associated to the outer end of the first supporting portion (17) and said at least one second substantially inextensible strip (58-61) being associated to the outer end of the second supporting portion (18).

5. The joint assembly (12) according to claim 2, wherein said expulsion speed controller (19) further comprises at least one locking member (32, 33) for tensioning and gradually releasing said at least one substantially inextensible strip (54-61).

6. The joint assembly (12) according to claim 5, wherein said at least one locking member (32, 33) is located at an intermediate portion of said at least one substantially inextensible strip (54-61).

7. The joint assembly (12) according to claim 5, wherein said at least one locking member (32, 33) comprises a clamp.

8. The joint assembly (12) according to claim 7, wherein said clamp comprises a pair of jaws (42, 43) defining therebetween a clearance within which the at least one substantially inextensible strip is engaged.

9. The joint assembly (12) according to claim 5, wherein said expulsion speed controller (19) comprises a plurality of said locking members (32, 33) engaging said at least one first substantially inextensible strip (54-57) and said at least one second substantially inextensible strip (58-61).

10. The joint assembly (12) according to claim 1, wherein said expulsion speed controller (19) comprises at least one longitudinal strap axially constraining the outer ends of the first and second supporting portions (17, 18).

11. The joint assembly (12) according to claim 1, wherein said supporting element (16) is substantially tubular in shape.

12. The joint assembly (12) according to claim 11, wherein said supporting element (16) is substantially frusto-conical in shape.

13. The joint assembly (12) according to claim 1, wherein said supporting element (16) comprises two supporting portions (17, 18) axially arranged to face each other in correspondence of the inner ends thereof, said supporting portions (17, 18) being detachably connected to each other.

14. The joint assembly (12) according to claim 1, wherein said supporting element (16) is made of a single piece provided with a frangible zone allowing an easy rupture of the supporting element (16) into said first and second supporting portions (17, 18).

15. The joint assembly (12) according to claim 1, wherein said tubular elastic sleeve (15) comprises an electric insulating layer (23).

16. The joint assembly (12) according to claim 15, wherein said tubular elastic sleeve (15) further comprises a semiconductive layer (24) surrounding said electric insulating layer (23).

17. The joint assembly (12) according to claim 16, further comprising a tubular elastic outer sheath in a position which is radially external with respect to said tubular elastic sleeve (15).

18. The joint assembly (12) according to claim 16, further comprising a tubular metal braid positioned around said tubular elastic sleeve (15).

19. A method for splicing a first and a second electric cable (1, 2) comprising respective conductors (3, 4), said method comprising the steps of:
   providing a tubular elastic sleeve (15) supported in a radially expanded condition on a removable hollow supporting element (16) detachable in a first supporting portion (17) and a second supporting portion (18),
   placing said sleeve (15) fitted on said supporting element (16) substantially coaxially with one of said first electric cable (1) and said second electric cable (2) and radially external thereto,
   forming an electric connection between said conductors (3, 4) thereby obtaining a splicing zone (11),
   placing said sleeve (15) fitted on said supporting element (16) substantially coaxially with said splicing zone (11) and radially external thereto,
   triggering an axial displacement of said first and second supporting portions (17, 18) so as to start an elastic recovering of the tubular sleeve (15) onto said splicing zone (11) capable to expel said first and second supporting portions (17, 18) from the sleeve (15) at an expulsion speed, and
   adjusting said expulsion speed of the first and second supporting portions (17, 18) away from said splicing zone (11) so as to adapt said expulsion speed to said elastic recovering of the tubular sleeve (15).

20. The method according to claim 19, wherein said first and second supporting portions (17, 18) are constrained to each other, the step of triggering the axial displacement of the first and second supporting portions (17, 18) comprising the step of reciprocally detaching said first and second supporting portions (17, 18).

21. The method according to claim 19, wherein said supporting element (16) is made of a single piece provided with a frangible zone, the step of triggering the axial displacement of the first and second supporting portions (17, 18) comprising the step of rupturing said supporting element (16) along said frangible zone.

22. The method according to claim 19, wherein said first and second supporting portions (17, 18) are expelled from said sleeve (15) in a substantially simultaneous manner.

23. The method according to claim 19, wherein said first and second supporting portions (17, 18) are expelled from said sleeve (15) at different time instants.

24. The method according to claim 19, wherein said adjusting step is carried out simultaneously on said first and second supporting portions (17, 18).

25. The method according to claim 19, wherein said adjusting step is carried out on said first and second supporting portions (17, 18) at different time instants.

26. The method according to claim 19, wherein said adjusting step comprises the step of setting said expulsion speed to be substantially proportional to the recovering speed of the tubular sleeve (15).

27. The method according to claim 19, wherein said adjusting step comprises the step of reducing said expulsion speed.

28. The method according to claim 27, wherein said adjusting step comprises the step of reducing the expulsion speed of said first and second supporting portions up to zero.

29. The method according to claim 19, wherein said adjusting step comprises the step of constraining the outer end of said first supporting portion (17) to the outer end of said second supporting portion (18).

30. The method according to claim 29, wherein the outer end of the first supporting portion (17) and the outer end of the second supporting portion (18) are constrained by means of at least one substantially inextensible strip (54-61).

31. The method according to claim 30, further comprising the step of tensioning said at least one substantially inextensible strip (54-61) before the step of triggering the axial displacement of the first and second supporting portions (17, 18) is carried out.

32. The method according to claim 30, further comprising the step of tensioning said at least one substantially inextensible strip (54-61) during the step of triggering the axial displacement of the first and second supporting portions (17, 18).

33. The method according to claim 30, wherein said adjusting step comprises the step of gradually releasing said at least one substantially inextensible strip (54-61).

34. The method according to claim 33, wherein said releasing step is carried out by acting on a locking member (32, 33) which engages said at least one substantially inextensible strip (54-61).

35. The method according to claim 19, wherein said adjusting step is carried out by providing a pair of longitudinal substantially inextensible strips (54-57; 58-61), each end of said strips (54-57; 58-61) being fastened to a respective outer end of the first and of the second supporting portions (17, 18).

* * * * *